Feb. 1, 1966  F. R. SWANSON ETAL  3,232,141
MACHINE TOOL
Filed Dec. 26, 1961  4 Sheets-Sheet 1

Inventors:
Fred R. Swanson
Carl F. Erikson
By Hofgren, Brady,
Wegner, Allen & Stellman
Att'ys

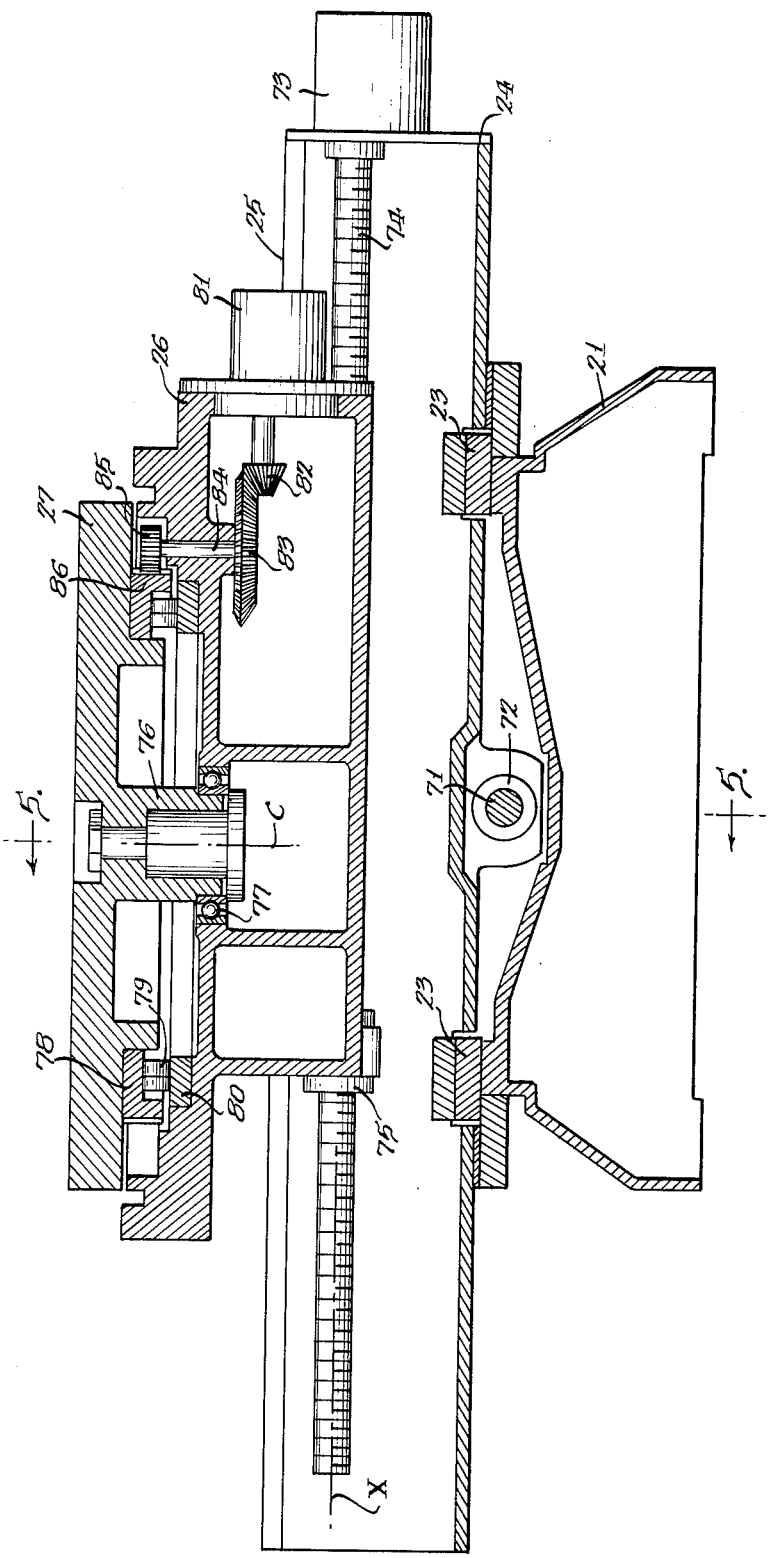

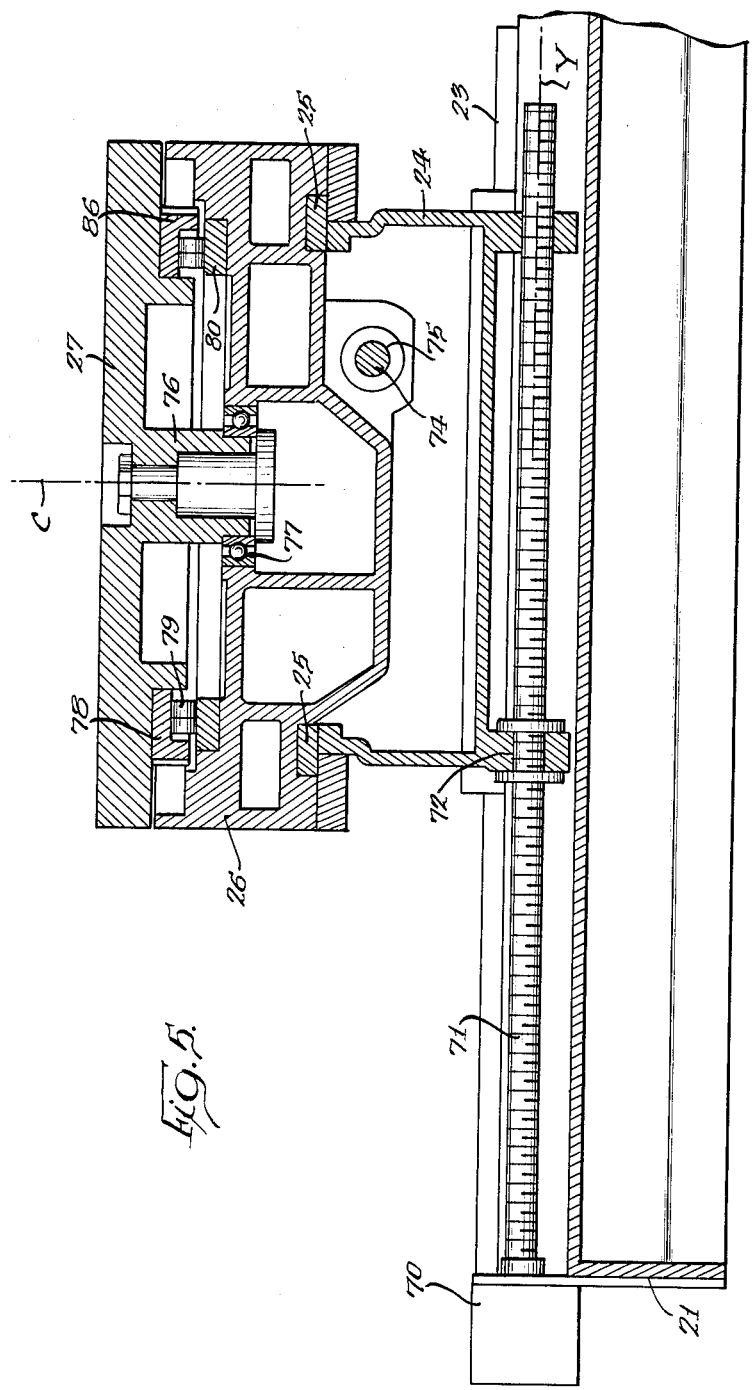

3,232,141
MACHINE TOOL
Fred R. Swanson, Rockford, and Carl F. Erikson, Belvidere, Ill., assignors to Sundstrand Corporation, a corporation of Illinois
Filed Dec. 26, 1961, Ser. No. 162,148
5 Claims. (Cl. 77—31)

This application is a continuation-in-part of our application Serial No. 59,236 filed September 29, 1960 and now Patent No. 3,136,563.

This application relates to a machine tool and more particularly to a multi-axis machine tool for machining workpieces in response to numerical control signals.

An object of this invention is to provide a new and improved machine tool which more nearly fully utilizes the control capabilities provided by numerical control.

Another object of the invention is to provide a versatile machine tool in which movable parts are provided having five different axes of movement to obtain cost reduction as well as accuracy due to the avoidance of relocating a workpiece because of the ability to present all the side surfaces, the top, and in-between surfaces of the workpiece to a tool.

Still another object of the invention is to provide such a machine tool in which an auxiliary axis in space is provided that can be used at any angle between the aforesaid five axes for drilling operations and the like with this auxiliary axis being in spaced parallel relation to the main spindle.

An additional object of the invention is to provide a machine tool utilizing five axes of motion comprising means for supporting a workpiece for movements along X and Y axes, means on said first means and rotatable relative thereto and on which the workpiece is supported for rotatably orienting the workpiece about an axis normal to the X and Y axes, a spindle head having a tool-carrying spindle movable toward and away from the table along a Z axis normal to the plane of the X and Y axes, and means mounting the spindle head for rotation about an axis normal to the centerline of the spindle to vary the angle of inclination of the spindle relative to a workpiece.

Further objects and advantages will become apparent from the following detailed description taken in connection with the accompanying drawings in which:

FIG. 4 is a vertical section taken generally along the line 4—4 in FIG. 1; and FIG. 5 is a vertical section taken generally along the line 5—5 in FIG. 4.

Figure 1:
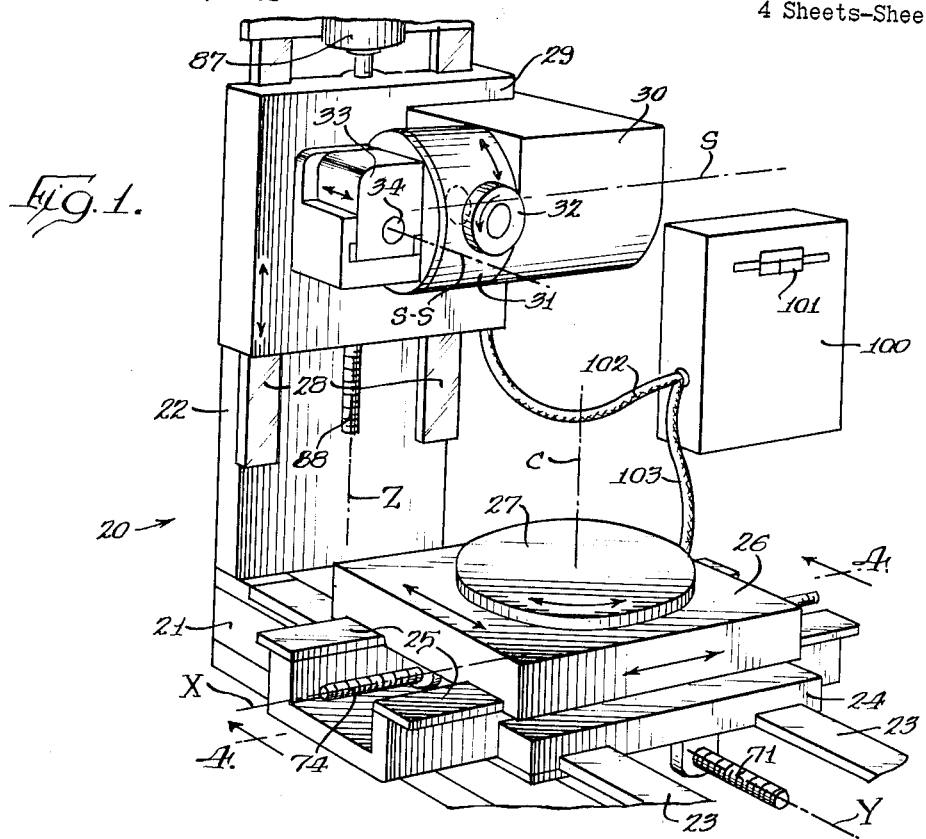
FIG. 1 is a fragmentary perspective view of the machine tool and numerical control therefor.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

As shown in FIG. 1, a machine tool, indicated generally at 20, embodies a bed or base 21 having an upstanding column 22 at an end thereof with ways 23 on the bed supporting a saddle 24 for movement along a Y axis indicated in FIG. 1 toward and away from the column. The saddle 24 has ways 25 movably supporting a linear table 26 for linear movement along an X axis transverse to that of the Y axis movement of the saddle 24. With the table 26 being at an elevation above the saddle 24, it will be seen that the movement of these two components is in different spaced vertical planes; however, for ease in description the X and Y axes of movement are referred to as being normal to each other. With the movements of the saddle 24 and table 26, a workpiece can be bodily positioned relative to the column 22 and the tool supported thereby. This is accomplished for preliminary setting up of a cutting operation and also movements along these axes can take place during a cycle as required to perform the desired operation.

A rotary table 27 is mounted on the linear table 26 for rotation about a C axis, so designated in FIG. 1, to present any side part of a workpiece as well as the top thereof or an intermediate surface to a tool supported on the column.

The column 22 has ways 28 which movably support a vertical saddle 29 carrying a transmission head 30 on which a spindle head 31 is rotatably adjustably mounted about an S axis which is parallel to the planes of saddle and table movements and normal to the axis of movement of the vertical saddle 29 which is designated Z in FIG. 1. The Z axis is normal to the planes of movement of the saddle 24 and linear table 26.

An auxiliary head 33 is carried on the spindle head 31 and has a spindle 34 with the auxiliary head being movable along an axis S—S which provides a feed movement of the spindle 34 along an axis parallel to the centerline of the spindle 32 and which provides an operable auxiliary axis in space that can be used at any angle between the five axes described previously.

Figure 2:
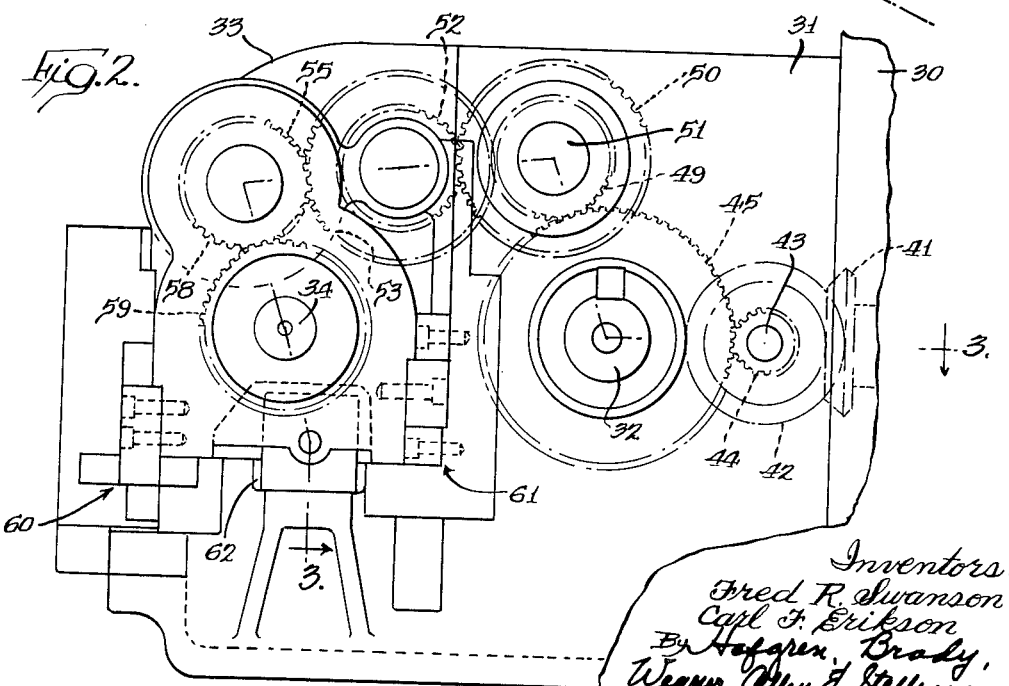
FIG. 2 is a front view of the spindle head and auxiliary head associated therewith on an enlarged scale.
Figure 3:
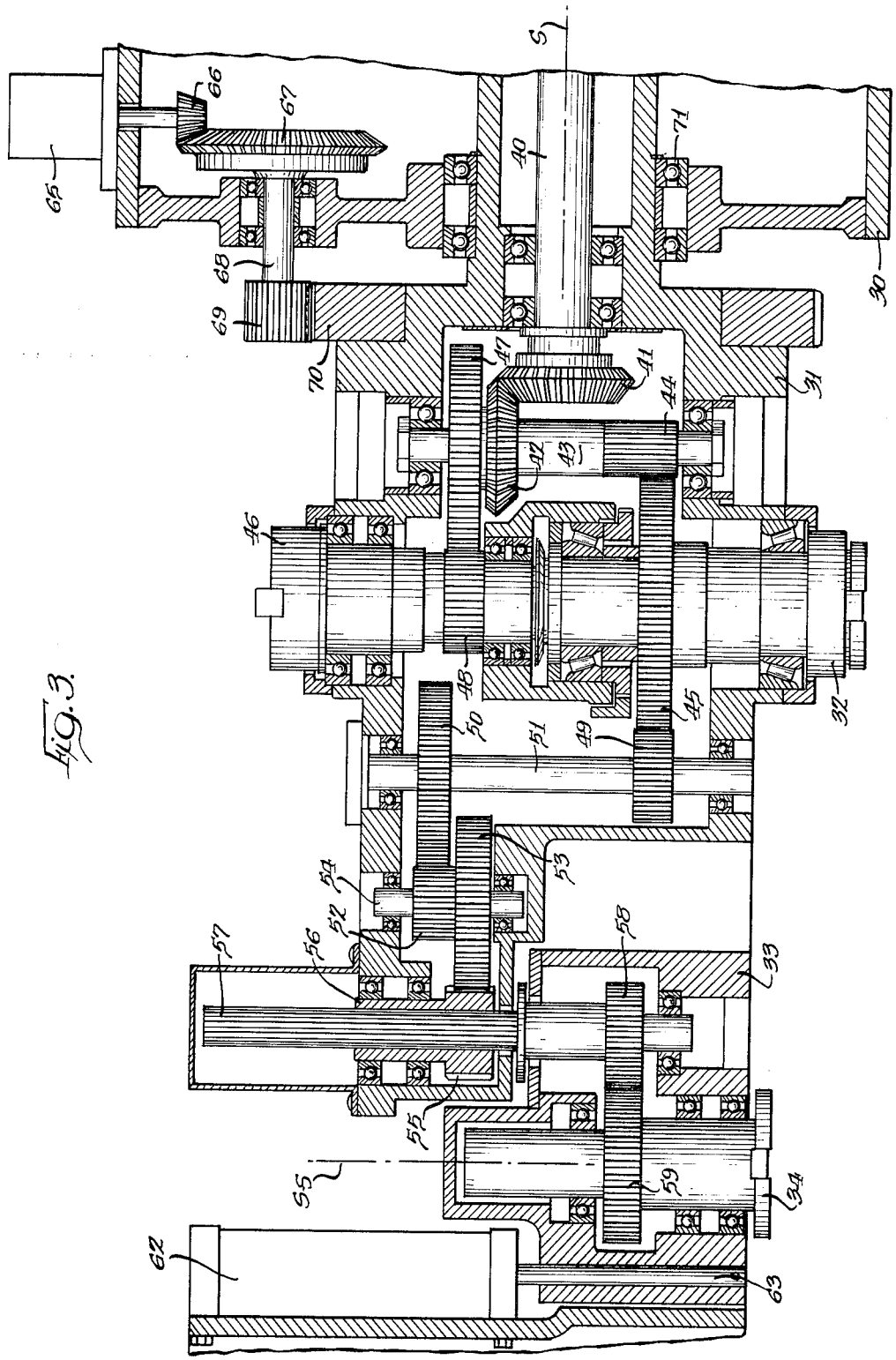
FIG. 3 is a layout section of the spindle head and auxiliary head and taken generally along the line 3—3 in FIG. 2 and on a further enlarged scale.

The drive for the spindles and the means mounting the spindle head 31 and auxiliary head 33 for movement are shown more particularly in FIGS. 2 and 3. An output shaft 40 of the transmission head has a bevel gear 41 meshing with a bevel gear 42 on a jack shaft 43 rotatably mounted in the spindle head with a gear 44 thereon meshing with a gear 45 on the spindle 32 to provide rotation thereof. A second axially aligned spindle 46 is driven from the jack shaft by means of gears 47 and 48 to provide a relatively high speed spindle as compared to the speed of rotation of the spindle 32.

The auxiliary spindle 34 is driven from the spindle 32 through a gear train including gears 49 and 50 on a shaft 51 and gears 52 and 53 on a shaft 54 rotatably mounted in the spindle head 31. The gear 53 meshes with a gear 55 formed on a sleeve 56 which is splined to a shaft 57 which extends outside the spindle head 31 and into the auxiliary head 33 where a gear 58 thereon meshes with a gear 59 on the auxiliary spindle 34.

With this drive train of conventional components, the auxiliary spindle 34 is driven from the spindle 32 with the auxiliary head being able to move relative to the spindle head 31 while the drive is maintained. The auxiliary spindle head is mounted on the spindle head 31 by ways indicated generally at 60 and 61 in FIG. 2. The heads are moved relative to each other by a motor in the form of a hydraulic cylinder 62 which is mounted on the spindle head 31 and has a piston rod 63 connected to the auxiliary head 33.

The spindle head 31 is rotatably adjusted about the S axis by means including a motor 65 carried on the transmission head 30 which through meshing gears 66 and 67 drives a shaft 68 having a gear 69 engaging a gear 70 fixed to the spindle head 31 whereby operation of the motor causes rotation of the spindle head 31 about the shaft 40. The spindle head 31 is mounted for this movement in the transmission head by means of bearings indicated at 71.

The relation of the bed, saddle, table and rotary table in addition to being shown in FIG. 1 is also shown in FIGS. 4 and 5 along with the means for moving these parts in response to numerical control signals. Means for moving the saddle 24 along the ways 23 of the bed comprises a motor 70 driving a lead screw 71 which threadably engages parts of the saddle as indicated at 72. Means for moving the table 26 on the saddle in response to numerical control signals comprises a motor 73 which drives a lead screw 74 threadably connected to the table as indicated at 75.

The rotary table 27 is mounted on the table 26 for rotation as previously described by means of a central hub 76 supported in a bearing 77 mounted in the table and an annular way 78 on the underside of the rotary table is supported by roller bearings 79 supported on a race 80 on the table 26. Means for moving the rotary table in response to numerical control signals comprises a motor 81 having an output shaft with a gear 82 thereon meshing with a gear 83 on a shaft 84 rotatably mounted in the linear table 26. The shaft 84 has a gear 85 which meshes with a circular gear 86 on the rotary table 27.

Means for moving the vertical saddle 29 on the column in response to numerical control signals comprises a motor 87 which drives a lead screw 88 connected to the saddle.

With the structure disclosed a workpiece may be positioned for a machining operation thereon by positioning along and about the X, Y and C axes resulting from independent or simultaneous positioning of the saddle, table and rotary table to present a workpiece positioned both bodily and rotatively to the tool to be used. The tool is presented to the workpiece by movement of the vertical saddle along the Z axis and the spindle head about the S axis. During a cycle, the positions may be changed by movements along one or more of the axes in response to numerical control signals supplied by tape or other means to the various motive means for the parts. Additionally, the auxiliary head 33 provides an axially movable spindle movable at any angle relative to the workpiece dependent upon the positioning of the component parts about and along their axes. Although as shown in FIG. 3, the spindle head 31 has a low speed spindle 32 and a high speed spindle 46, the auxiliary spindle 34 may also be used as a high speed spindle avoiding the necessity of having the high speed spindle 46 and the mechanism associated therewith.

As shown in FIG. 1, the numerical control signals may be provided from a conventional system, such as indicated at 100, in which a tape reader 101 or other similar element supplies control indicia to a system which detects the operation of the components that is to occur and these signals are fed through lines indicated at 102 and 103 to the machine tool.

We claim:
1. In a machine tool having a bed with an upwardly extending column adjacent thereto, a saddle mounted on the bed for bi-directional movements along a first axis, a table mounted on the saddle for bi-directional movements along a second axis normal to said first axis, a rotary table mounted on said table for rotation about a third axis extending normal to the planes containing said first and second axes, a head mounted on the column for bi-directional movement along a fourth axis parallel to the third axis and spaced therefrom, and means mounting the head for rotation relative to the column about a fifth axis lying in a plane spaced from and parallel to the plane containing the fourth axis, and an auxiliary head on said head movable linearly along a sixth axis extending away from the plane containing the fourth axis and having a disposition dependent upon the rotative position of the head about the fifth axis.

2. A machine tool for contour machining of a workpiece utilizing five or less axes of motion comprising, means for supporting a workpiece for movements along X and Y axes, means on said first means and rotatable relative thereto and on which the workpiece is supported for rotatably orienting the workpiece about an axis normal to the X and Y axes, a spindle head having a tool carrying spindle movable toward and away from the table along a Z axis normal to the plane of the X and Y axes, means mounting the spindle head for rotation about an axis lying a plane parallel to the plane containing the Z axis to vary the angle of inclination of the spindle relative to a workpiece, and means mounting the spindle head for movement toward and away from the workpiece along the longitudinal axis of the spindle.

3. A machine tool for machining parts comprising, a bed, a column extending upwardly from the bed, a saddle movable on said bed along a first axis, a table mounted on said saddle for movement therewith and movement relative thereto along a second axis normal to the first axis, said first and second axes lying in spaced parallel planes and movements along the first and second axes bodily positioning a workpiece relative to said bed and column, a rotary table on said table for supporting a workpiece and rotatable about a third axis normal to said planes for rotatively positioning the workpiece, a spindle head movable on the column lengthwise thereof along a fourth axis normal to said planes for presenting a spindle to the workpiece at a desired elevation relative to the bed, means mounting the spindle head for rotation about a fifth axis parallel to said planes and parallel to the plane containing said fourth axis for angularly orienting the spindle centerline to said workpiece, and means for axially moving the spindle.

4. In a machine tool having a bed with an upwardly extending column adjacent thereto, a saddle mounted on the bed for bi-directional movements along a first axis, a table mounted on the saddle for bi-directional movements along a second axis normal to said first axis, a rotary table mounted on said table for rotation about a third axis extending normal to the planes containing said first and second axes, a head mounted on the column for bi-directional movement along a fourth axis parallel to the third axis and spaced therefrom, and means mounting the head for rotation relative to the column about a fifth axis lying in a plane spaced from and parallel to the plane containing the fourth axis and extending from side to side of the machine tool, and a spindle movable linearly along a sixth axis extending away from the plane containing the fourth axis and having a disposition dependent upon the rotative position of the head about the fifth axis.

5. In a machine tool having a bed with an upwardly extending column having spaced apart ways adjacent thereto, workpiece supporting means having movements relative to three different axes to locate a workpiece, a head with a spindle mounted on the column for bi-directional movement along a fourth axis, said spindle being located between said ways in all positions of said head, means mounting the head for rotation relative to the column about a fifth axis, and an auxiliary head close coupled to said head and movable linearly along a sixth axis and having a disposition dependent upon the rotative position of the head about the fifth axis, and a relatively high speed spindle in said auxiliary head in spaced parallel relation with the spindle in said head.

References Cited by the Examiner
UNITED STATES PATENTS

| | | | |
|---|---|---|---|
| 2,620,710 | 12/1952 | Gallimore et al. | 77—31 |
| 2,939,367 | 6/1960 | Thomas | 318—162 |
| 2,960,893 | 11/1960 | Ocenasek | 77—55 |

FOREIGN PATENTS

| | | |
|---|---|---|
| 524,732 | 8/1940 | Great Britain. |
| 277,394 | 12/1951 | Switzerland. |

WILLIAM W. DYER, Jr., *Primary Examiner.*
FRANK E. BAILEY, J. SPENCER OVERHOLSER, *Examiners.*